United States Patent
Zeizel

[11] 3,908,581
[45] Sept. 30, 1975

[54] MOTORIST'S WARNING SIGN

[76] Inventor: Irving Zeizel, c/o George Spector, Room 3615, Woolworth Bldg., 233 Broadway, New York, N.Y. 10007

[22] Filed: Mar. 12, 1973

[21] Appl. No.: 340,021

[52] U.S. Cl.............................................. 116/63 P
[51] Int. Cl.............................................. E01f 9/01
[58] Field of Search............ 116/63, 63 P; 40/125 H, 40/125 J; 33/98, 105, 116, 92; 256/13.1

[56] References Cited
UNITED STATES PATENTS

| | | | |
|---|---|---|---|
| 185,706 | 12/1876 | Tullock | 33/92 |
| 2,451,875 | 10/1948 | Ryder | 116/63 P |
| 2,613,464 | 10/1952 | Transue | 116/63 P |
| 3,589,328 | 6/1971 | Kiniry | 116/63 P |
| 3,593,681 | 7/1971 | Sernovitz | 116/63 P |

FOREIGN PATENTS OR APPLICATIONS

| | | | |
|---|---|---|---|
| 985,881 | 3/1965 | United Kingdom | 116/63 P |
| 1,052,406 | 12/1966 | United Kingdom | 116/63 P |
| 1,167,085 | 10/1969 | United Kingdom | 116/63 P |
| 1,123,950 | 6/1956 | France | 116/63 P |

*Primary Examiner*—S. Clement Swisher
*Assistant Examiner*—Denis E. Corr

[57] ABSTRACT

A novel warning sign for use on a highway to warn approaching automobiles; the device being readily collapsible so to be conveniently carried in a trunk compartment of a vehicle, so to be handy for immediate use; the device consisting of three straight luminescent red arms pivotally connected at their ends so that when erected they form an upstanding triangle supported upon a horizontal base block, and which when collapsed form a compact unit by the arms all resting adjacent the base block.

2 Claims, 9 Drawing Figures

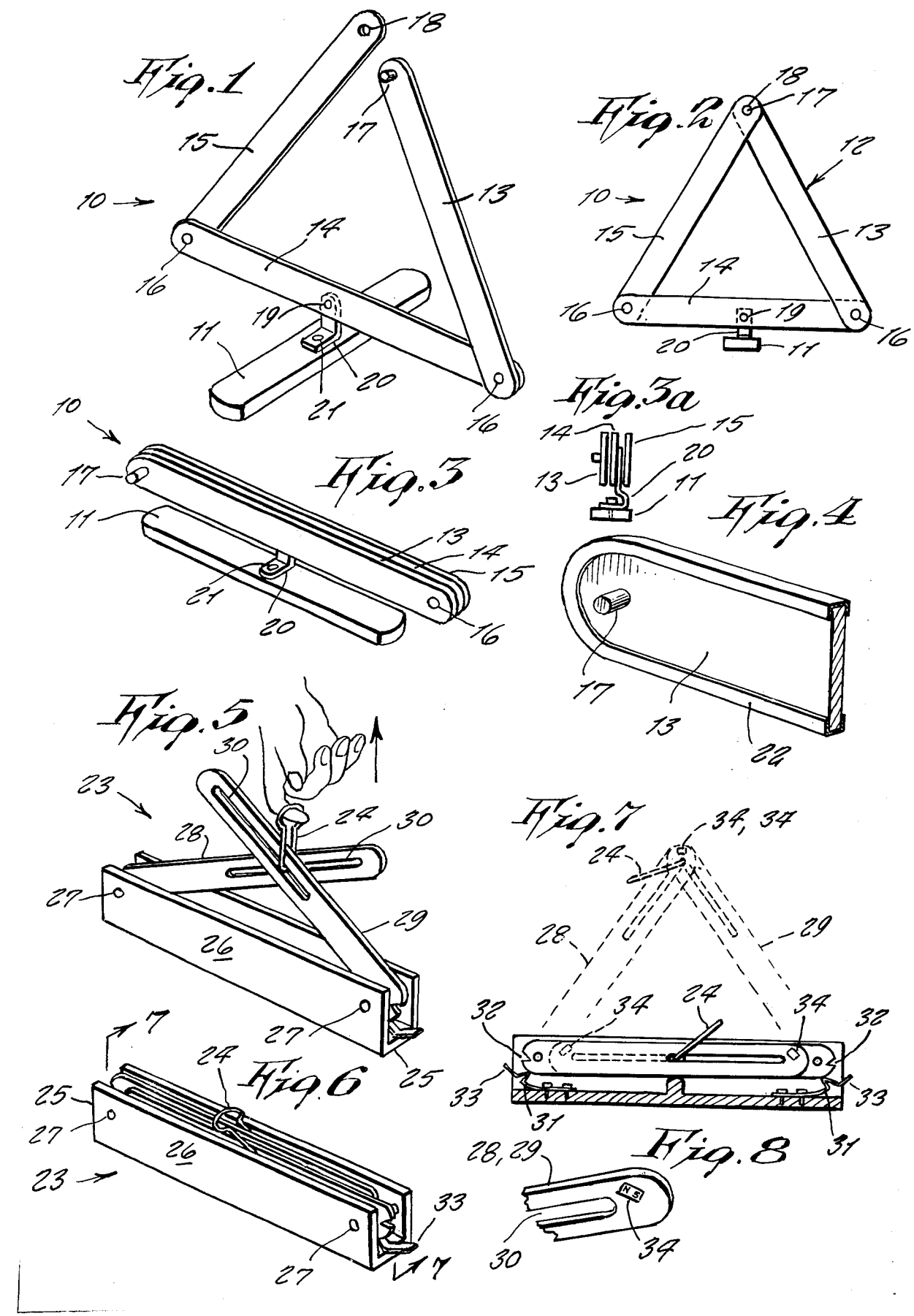

MOTORIST'S WARNING SIGN

This invention relates generally to highway warning signs.

A principle object of the present invention is to provide a warning sign which can be conveniently carried in a minimum space within any automotive vehicle so to be always handy for use to warn approaching other vehicles in case the automobile is broken down on a highway such as by a flat tire or the like, and a repair is necessitated on the road right-of-way, thus notifying other motorists to pass around the stopped vehicle instead of hitting into it.

Another object is to provide a motorist's warning sign which is collapsible to take up only small space in the car, and which when needed for use can be quickly and easily erected within minimum time so to be immediately operative and effective in an emergency.

Yet another object is to provide a motorist's warning sign, which can be easily placable upon a vehicle roof so that it can be seen far away by approaching traffic so to allow them time to comfortably transfer to another traffic lane; or which can be stood up upon the highway surface some distance away from the stopped car.

Other objects are to provide a MOTORIST'S WARNING SIGN, which, is simple in design, inexpensive to manufacture, rugged in construction, easy to use and efficient in operation.

These and other objects will be readily evident upon a study of the specifications and the accompanying drawings wherein:

FIG. 1 is a perspective view of one form of the invention in process of erection, FIG. 2 is a side view thereof fully erected.

FIG. 3 is a view thereof shown collapsed.

FIG. 3a is an end view thereof.

FIG. 4 is a detail view of one of the arms shown in cross section.

FIG. 5 is a perspective view of a modified form of the invention, shown being erected.

FIG. 6 shows the same collapsed.

FIG. 7 is a cross section on line 7—7 of FIG. 6.

FIG. 8 is a fragmentary detail of one of the arms, showing a magnet construction incorporated therein.

Referring now to the drawing in detail, and more particularly to FIGS. 1 through 4 at this time, the reference numeral 10 represents a motorist's warning sign according to the present invention wherein there is a base block 11 for placement upon any horizontal surface, and a collapsible triangle 12 pivotably mounted upon the base block.

The triangle 12 is comprised of three straight arms 13, 14 and 15, which are together attached freely pivotable so that the triangle is collapsible. The center arm 14 has a rivet 16 at each opposite end; each rivet pivotally supporting one end of either arms 13 or 15. The opposite end of arm 13 has a projecting stud 17 that is removably receivable into an opening 18 in the opposite end of the arm 15.

The arms are of equal length and may be made of any flat material such as plastic or metal that is of red luminescent color so to attract attention. If made of plastic the material may be lens surfaced so to reflect headlight rays, or it may be additionally transluscent so the light can glow through it.

The center arm 14 at its mid-center is secured by a rivet 19 to a vertical leg of an angle bracket 20 that is mounted pivotally upon a longitudinal center of the base block by means of a single rivet 21 through a horizontal leg of the angle bracket.

Thus in a retracted position as shown in FIGS. 3 and 3a, the arms are parallel and all adjacent the base block. In operative use the arms are erected to form the triangle which is then pivoted about the rivet 21 so to assume the position shown in FIGS. 1 and 2.

In FIG. 4 the edge of each arm is shown to be framed in an edging 22 for more finished and attractive appearance.

In FIGS. 5 through 8, a modified design of motorist's warning sign 23 includes a novel means whereby erection is more quickly and easily accomplished by simply pulling up on a ring 24. In this form of the invention, the base block comprises a channel 25 in which the outer side surfaces 26 are luminescent red so to serve as a middle arm. At each opposite end thereof a transverse rivet 27 supports pivotably one end of each arm 28 and 29, the opposite ends of these arms each having a longitudinal slot 30 that extends to the longitudinal center thereof so that the slot ends overlap each other when the arms are in a collapsed position, as shown in FIG. 7. The ring 24 is fitted through both slots 30. When the ring is pulled up, the arms pivot up to form the triangle.

The triangle is prevented from collapsing by itself, when erected, by means of a leaf spring 31 secured to each end of the channel; each spring being engagable in a V-notch 32 at the end of each arm when the arm is in erect position. To force the device into a collapsed position, the protruding ends 33 of the springs are simple depressed thus disengaging the springs from the notches.

As shown in FIG. 8 for further securing the arms in an erected position, a permanent magnet 34 is fitted in each one end of the arms that form the apex of the triangle, so that when erected, the magnets are adjacent each other so that magnetic attraction holds the triangle apex in erected position. Thus a modified design of the invention has been provided. While various changes may be made in the detail construction, it is understood that such changes will be within the spirit and scope of the present invention, as is defined by the appended claims.

I claim:

1. A device to warn approaching motorists of a stalled vehicle comprising a support base block and an assembly of parallel elongated arms pivotally secured to each other, said assembly being mounted on said base block, the longitudinal axis of said arms being disposed in spaced parallel planes, each of said arms having transverse widths whereby the transverse width of the base block is greater than the combined transverse width of said arms, the assembly being mounted longitudinally on the base block whereby the longitudinal axis of both base block and assembly are in the same plane, said assembly being movable to a collapsed compact position wherein the longitudinal axis of the arms are parallel and at a minimum distance from the base block providing compactness, said assembly being movable to an expanded position forming a geometric figure wherein the longitudinal axis of the arms are inclined to the longitudinal axis of the base block, wherein two of said arms having spaced ends pivotally secured to the base block with pivot pins having transversely spaced axis at least one of said arms having a longitudinal slot therein slidably connected to said other arm whereby the assembly can be moved from the base to the expanded position, including spring means mounted on said block engaging said arms, further including means on said arms coacting with said spring means to retain said arms in the expanded position.

2. A device to warn approaching motorists of a stalled vehicle comprising a support base block and an assembly of parallel elongated arms pivotally secured to each other, said assembly being mounted on said base block, the longitudinal axis of said arms being disposed in spaced parallel planes, each of said arms having transverse widths whereby the transverse width of the base block is greater than the combined transverse width of said arms, the assembly being mounted longitudinally on the base block whereby the longitudinal axis of both base block and assembly are in the same plane, said assembly being movable to a collapsed compact position wherein the longitudinal axis of the arms are parallel and at a minimum distance from the base block providing compactness, said assembly being movable to an expanded position forming a geometric figure wherein the longitudinal axis of the arms are inclined to the longitudinal axis of the base block, wherein two of said arms have spaced ends pivotally secured to the base block with pivot pins having transversely spaced axis and said arms having longitudinally adjustable pivotable connection therebetween whereby the assembly can be moved away from the base to the expanded position, and releasable holding means for retaining the lower ends in the expanded position, said base block being channel shaped, wherein said holding means comprises a pair of leaf springs mounted on the base adjacent to said spaced ends, wherein the spaced ends each have a notch and said springs each have a projection aligned with and biased to enter and engage each said notch when the arms are in the expanded position, said leaf springs being movable from said notches to permit pivotal movement of the arms to the collapsed position whereby the projections are not aligned with the notches.

* * * * *